United States Patent [19]

Agulnek

[11] 4,179,620
[45] Dec. 18, 1979

[54] CROSSOVER ARRANGEMENT FOR MULTIPLE SCANNING ARRAYS

[75] Inventor: Martin A. Agulnek, Sharon, Mass.

[73] Assignee: Xerox Corporation, Stamford, Conn.

[21] Appl. No.: 896,857

[22] Filed: Apr. 17, 1978

Related U.S. Application Data

[63] Continuation-in-part of Ser. No. 793,001, May 2, 1977.

[51] Int. Cl.² .............................................. G06K 7/10
[52] U.S. Cl. .................................... 250/566; 33/1 M; 235/454
[58] Field of Search ................ 33/1 M; 235/454, 470; 250/566

[56] References Cited

U.S. PATENT DOCUMENTS

| | | | |
|---|---|---|---|
| 3,555,246 | 1/1971 | Lemelson | 250/566 X |
| 3,560,716 | 2/1971 | White | 235/470 X |
| 3,983,364 | 9/1976 | Firehammer et al. | 235/454 X |

*Primary Examiner*—Lawrence J. Dahl

[57] ABSTRACT

A line scanning apparatus employing a multiplicity of linear arrays, the linear extent of which is less than the length of the scan line. To permit an entire line to be covered, the arrays are offset from one another in the direction of scan with adjoining array ends overlapped. To correct for the misalignment and redundancy introduced, the image data from the arrays is buffered until a line is completed when readout is initiated. During readout, cross over from one array to the next is effected within the overlapped areas and the redundant data discarded.

2 Claims, 10 Drawing Figures

LINE 1 ($\ell_1$)

LINE 2 ($\ell_2$)

LINE 3 ($\ell_3$)

CROSSOVER ARRANGEMENT FOR MULTIPLE SCANNING ARRAYS

This is a continuation-in-part of application Ser. No. 793,001 filed May 2, 1977.

This invention relates to raster input and output scanners and, more particularly to, raster input and output scanners having multiple linear arrays.

Scanning technology has progressed rapidly in recent years and today arrays of fairly substantial linear extent are available for use in raster scanners. Indeed, the linear extent of new arrays is in some cases many times the linear extent of earlier array designs. However, the length of even these recent array designs may still not be sufficient to enable a single array to span the entire width of the normal sized line, i.e. 8½ inches.

As a result, raster scanners often rely on shorter arrays and must, therefore, employ a multiplicity of arrays if the entire line is to be scanned in one pass. This raises the question of how to place the arrays so as to cover the entire line yet provide data representative of the line which is free of aberrations at the array junctures. Recently, interest has been expressed in optically-butted arrays. However, optical and optical/mechanical arrangements often experience difficulty in meeting and maintaining the tight tolerances necessary for aberration free scanning, particularly in operating machine environments.

It is, therefore, a principal object of the present invention to provide a new and improved raster scanner employing multiple arrays.

It is an object of the present invention to provide an improved single pass line scanner employing multiple linear arrays.

It is an object of the present invention to provide a system designed to accommodate misalignment of plural linear arrays.

It is an object of the present invention to provide scanning apparatus with plural relatively short linear arrays, having a composite length at least equal to the scan width.

It is an object of the present invention to provide a line scanner incorporating plural overlapping arrays whose composite length equals the length of the scanned lines, with electronic means for switching from one array to the next without introducing noticeable aberrations and stigmatism.

It is an object of the present invention to provide an improved linear array adapted to facilitate alignment between overlapping arrays.

This invention relates to a raster type input/output scanning apparatus cooperable with an input/output station to produce image data representative of an image bearing original or to produce an image from image data, the improvement comprising at least two arrays, each of the arrays comprising a plurality of discrete operating elements arranged in succession along the linear axis of the array, the length of each array being less than the width of the area scanned, means supporting said arrays for scanning movement relative to the station with the linear axis of the arrays extending in a direction substantially perpendicular to the direction of scanning movement, the arrays being supported so that the arrays overlap whereby to provide a composite array having a length at least equal to the width of the area scanned, memory means for at least temporarily storing the image data, means for actuating the arrays to scan the area, and image data transmitting means for transmitting image data between the memory means and the arrays in succession, the image data transmitting means crossing over from one array to the next succeeding array within the array overlap.

Other objects and advantages will be apparent from the following description and drawings in which.

Figure 1:
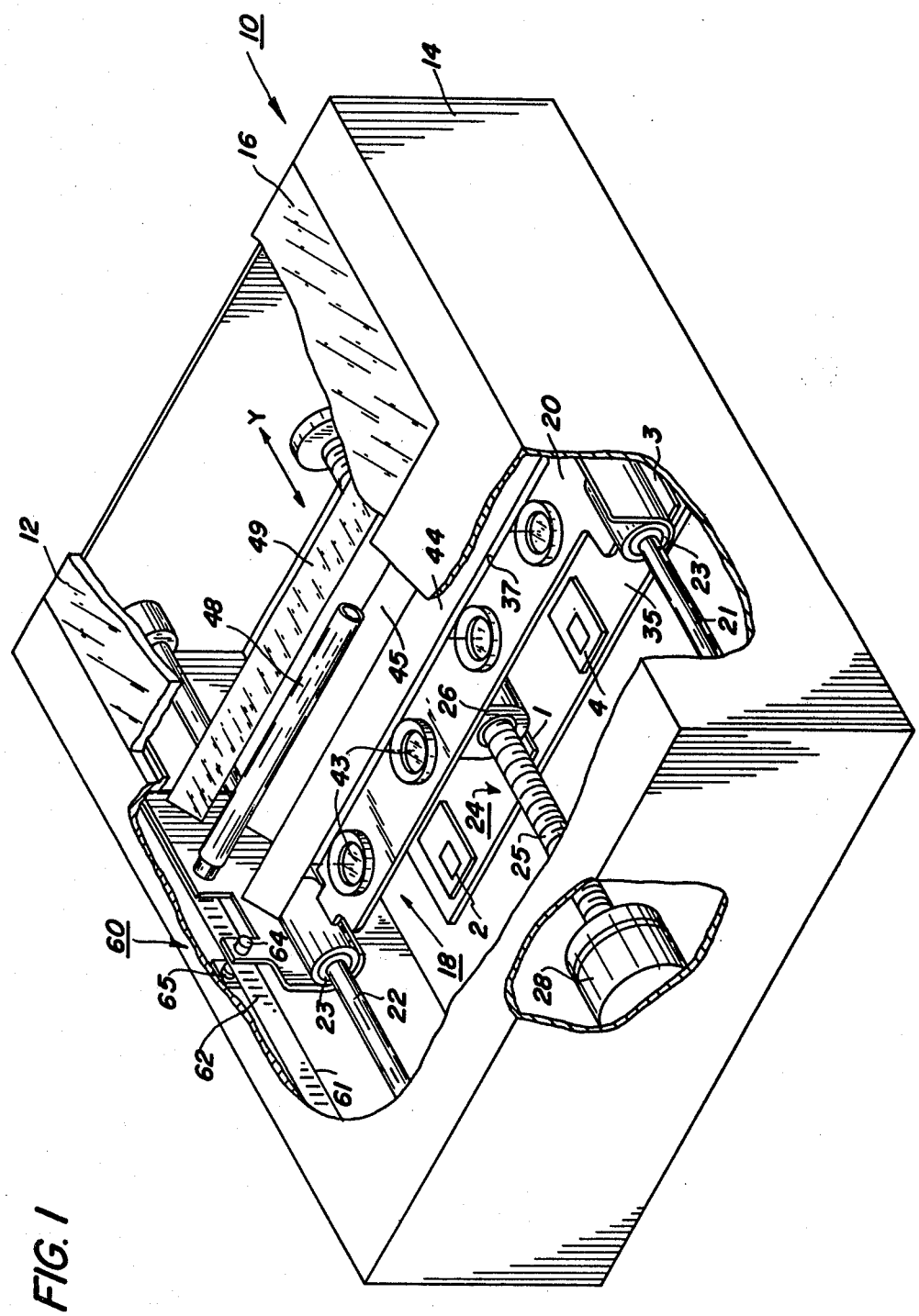
FIG. 1 is an isometric view showing a raster input scanner incorporating the multiple array arrangement of the present invention.

Referring to FIG. 1, an exemplary raster input scanning apparatus 10 is thereshown. Scanning apparatus 10, as will appear more fully herein scans an original document 12 line by line to produce a video signal representative of the original document 12. The video signal so produced may be thereafter used to reproduce or duplicate the original 12, or stored in memory for later use, or transmitted to a remote source, etc.

Scanning apparatus 10 comprises a box-like frame or housing 14, the upper surface of which includes a transparent platen section 16 on which the original document 12 to be scanned is disposed face down. A displaceable scanning mechanism designated generally by the numeral 18, is supported on frame 14 below platen 16 for movement back and forth underneath the platen 16 and the original document 12 thereon in the Y direction as shown by the solid line arrow in FIG. 1.

Scanning mechanism 18 includes a carriage 20 slidably supported upon parallel rods 21, 22 through journals 23. Rods 21, 22, which parallel the scanning direction along each side of platen 16, are suitably supported upon the frame 14.

Reciprocatory movement is imparted to carriage 20 by means of a screw type drive 24. Drive 24 includes a longitudinally extending threaded driving rod 25 rotatably journalled on frame 14 below carriage 20. Driving rod 25 is drivingly interconnected with carriage 20 through a cooperating internally threaded carriage segment 26. Driving rod 25 is driven by means of a reversible motor 28.

Figure 2:
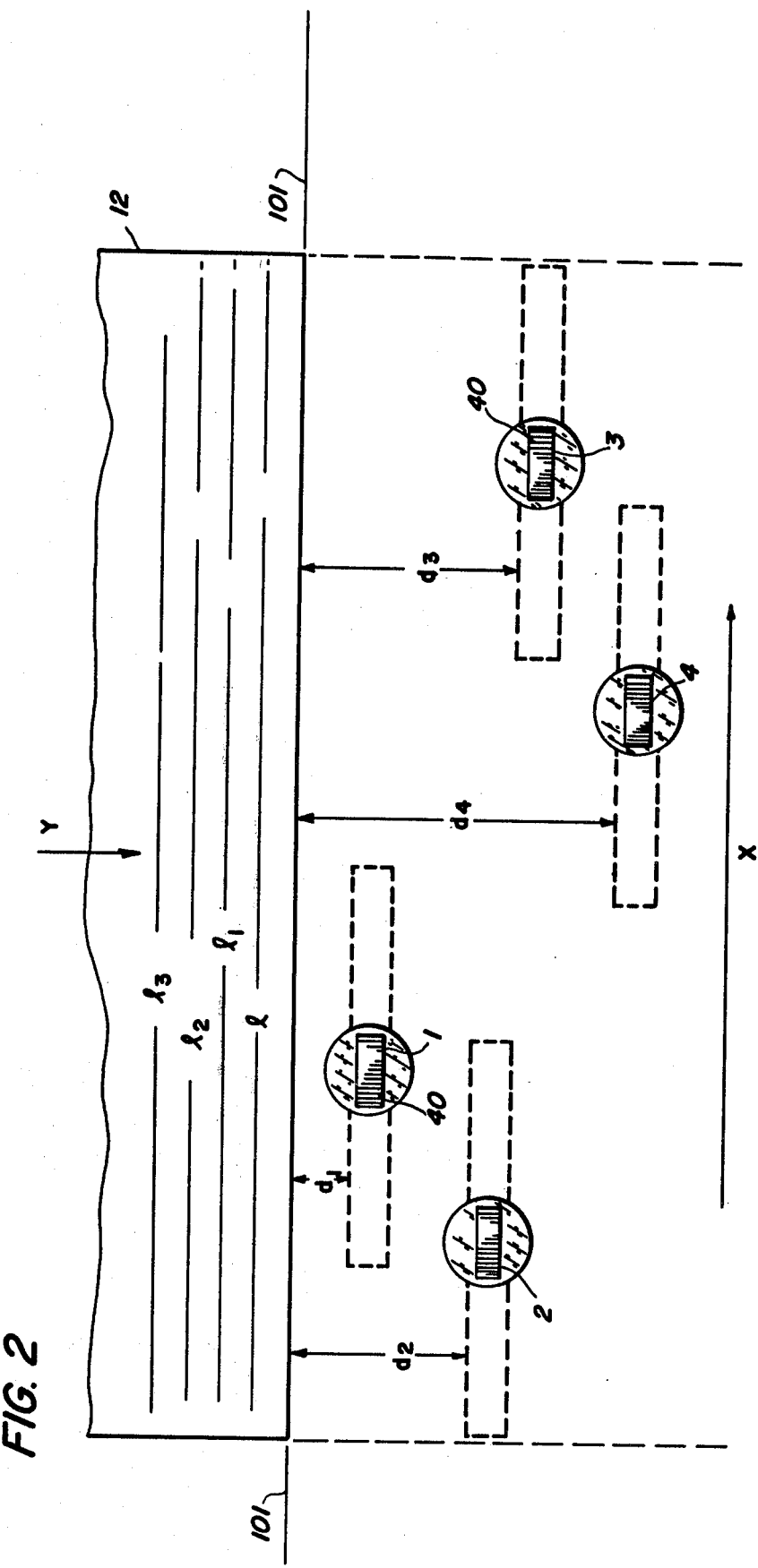
FIG. 2 is a schematic illustrating an exemplary array disposition.

A plurality of photosensitive linear arrays 1, 2, 3, 4 are carried on plate-like portion 35 of carriage 20. Arrays 1, 2, 3, 4 each comprise a series of individual photosensitive picture elements or pixels 40 arranged in succession along the array longitudinal axis. The arrays scan the original document 12 on platen 14 as scanning mechanism 18 moves therepast, scanning movement being in a direction (Y) substantially perpendicular to the array longitudinal axis (X). As best seen in FIG. 2, the arrays 1, 2, 3, 4 may, due to the difficulty in accurately aligning the arrays one with the other, be offset from one another in the direction of scanning movement (the Y direction). To accommodate the relatively short length of the individual arrays, the arrays overlap. In the exemplary illustration, the end portion of arrays 2, 1, 4 overlap the leading portion of the succeeding arrays 1, 4, 3 when looking from left to right in FIG. 2 along the X direction.

As will be understood, the length of the individual arrays 1, 2, 3, 4 may vary with different types of arrays and from manufacturer to manufacturer. As a result, the number of arrays required to cover the entire width of the original document 12 may vary from that illustrated herein.

Photosensitive elements or pixels 40 of arrays 1, 2, 3, 4 are normally silicon with carrier detection by means of phototransistors, photodiode-MOS amplifiers, or CCD detection circuits. One suitable array is the fairchild CCD 121-1728 pixel 2-phase linear array manufactured by Fairchild Corporation. As described, arrays 1, 2, 3, 4 are offset from one another in the scanning or sagittal direction (Y direction) but with an end portion of each array overlapping the leading portion of the next succeeding array to form in effect a composite unbroken array.

To focus the image onto the arrays 1, 2, 3, 4 a lens 43 is provided for each array. Lenses 43 are supported on carriage 20 in operative disposition with the array 1, 2, 3, 4 associated therewith. Mirrors 44, 45 on carriage 20 transmit the light images of the original via lenses 43 to arrays 1, 2, 3, 4. Lamp 48 is provided for illuminating the original document 12, lamp 48 being suitably supported on carriage 20. Reflector 49 focuses the light emitted by lamp 48 onto the surface of platen 16 and the original document 12 resting thereon.

In operation, an original document 12 to be scanned is disposed on platen 16. The scanning mechanism 18 including motor 28 is actuated, motor 28 when energized operating driving mechanism 24 to move carriage 20 back and forth below platen 16. Lamp 48 is energized during the scanning cycle to illuminate the original document 12.

To correlate movement of carriage 20 with operation of arrays 1, 2, 3, 4 an encoder 60 is provided. Encoder 60 generates timing pulses proportional to the velocity of scanning mechanism 18 in the Y direction. Encoder 60 includes a timing bar 61 having a succession of spaced apertures 62 therethrough disposed along one side of the path of movement of carriage 20 in parallel with the direction of movement of carriage 20. A suitable signal generator in the form of a photocell-lamp combination 64, 65 is provided on carriage 20 of scanning mechanism 18 with timing bar 61 disposed therebetween.

As carriage 20 of scanning mechanism 18 traverses back and forth to scan platen 16 and any document 12 thereon, photocell-lamp pair 64, 65 of encoder 60 moves therewith. Movement of the photocell-lamp pair of 64, 65 past timing bar 61 generates a pulse-like output signal in output lead 66 of photocell 64 directly proportional to the velocity of scanning mechanism 18.

As can be envisioned by those skilled in the art, supporting arrays 1, 2, 3, 4 in exact linear or tangential alignment (along the X-axis) and maintaining such alignment throughout the operating life of the scanning apparatus is extremely difficult and somewhat impracticable. To obviate this difficulty, arrays 1, 2, 3, 4 are initially mounted on carriage 20 in substantial tangential alignment. As can be seen in the exemplary showing of FIG. 2, this nevertheless often results in tangential array misalignment along the x-axis. If the disposition of the arrays 1, 2, 3, 4 is compared to a predetermined reference, such as the start of scan line 101 in FIG. 2, it can be seen that each array 1, 2, 3, 4 is displaced or offset from line 101 by some offset distance $d_1$, $d_2$, $d_3$, $d_4$, respectively. As will appear more fully herein, the individual offset distances of each array 1, 2, 3, 4 is determined and the result programmed in an offset counter 120 (FIG. 3) associated with each array. Offset counters 120 serve, at the start of the scanning cycle, to delay activation of the array associated therewith until the interval $d_1$, $d_2$, $d_3$, $d_4$, therefor is taken up.

Figure 3:
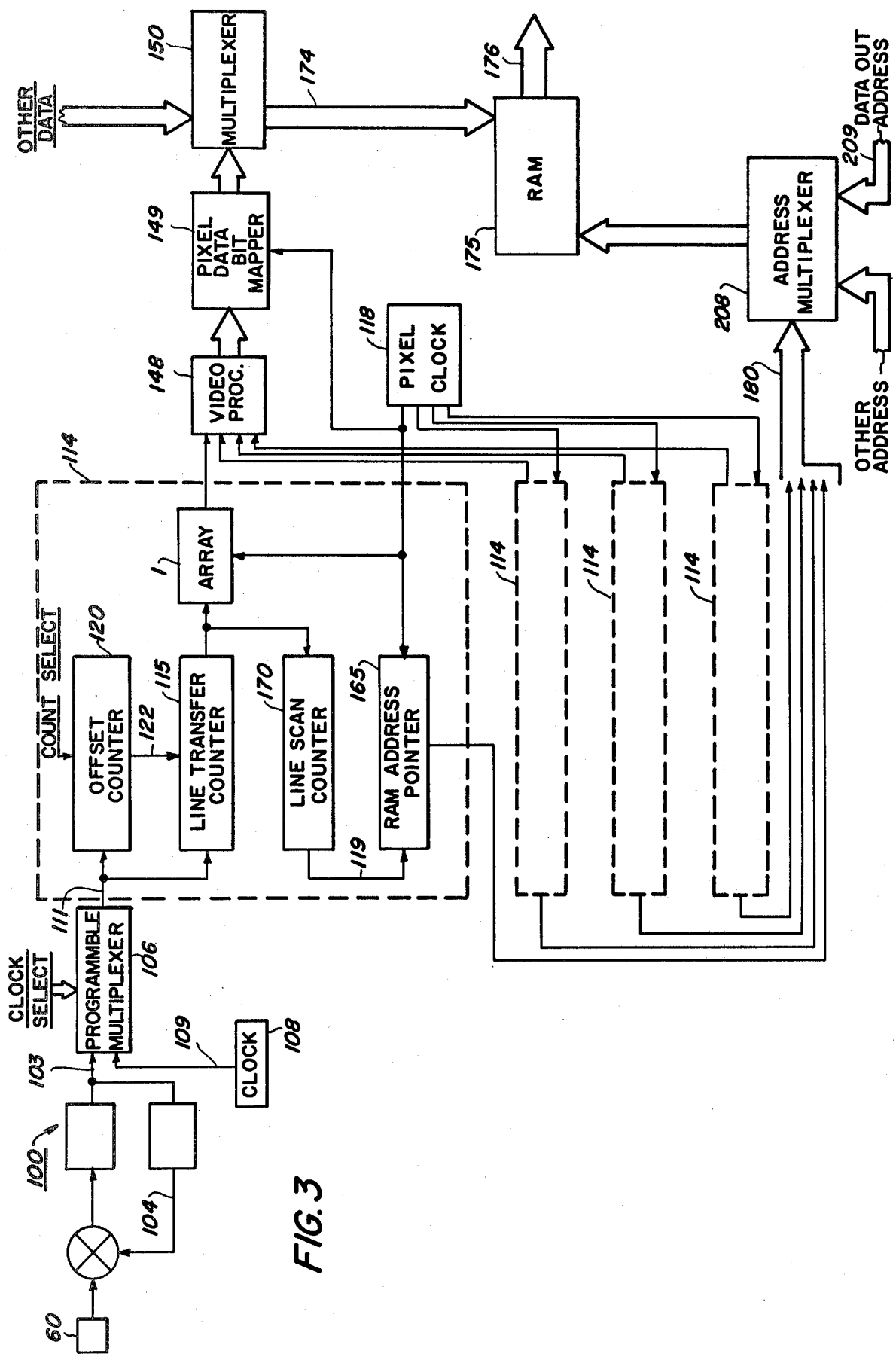
FIG. 3 is a schematic view of the scanner operating control.

Referring to FIG. 3, the pulse-like signal output of encoder 60 which is generated in response to movement of carriage 20 in the scanning direction (Y-direction), is inputted to a phase locked frequency multiplier network 100. Network 100, which is conventional, serves to multiply the relatively low frequency pulse-like signal input of encoder 60 to a high frequency clock signal in output lead 103. Feedback loop 104 of network 100 serves to phase lock the frequency of the signal in lead 103 with the frequency of the signal input from encoder 60.

As will be understood, changes in the rate of scan of carriage 20 produce a corresponding change in the frequency of the pulse-like signal generated by encoder 60. The frequency of the clock signal produced by network 100 undergoes a corresponding change. This results in a high frequency clock signal in output lead 103 directly related to the scanning velocity of carriage 20.

The clock signal in output lead 103 is inputted to programmable multiplexer 106. The output of a second or alternate clock signal source such as crystal controlled clock 108 is inputted via lead 109 to multiplexer 106. Multiplexer 106 selects either network 100 or clock 108 as the clock signal source in response to control instructions (CLOCK SELECT) from a suitable programmer (not shown). The selected clock signal appears in output lead 111 of multiplexer 106.

An operating circuit 114 is provided for each array 1, 2, 3, 4. Since the circuits 114 are the same for each array, the circuit 114 for array 1 only is described in detail. It is understood that the number of circuits 114 is equal to the number of arrays used.

Operating circuit 114 includes a line transfer counter 115 for controlling the array imaging line shutter time for each scan. Counter 115 is driven by the clock signal in output lead 111 of multiplexer 106. It is understood that where the signal input to counter 115 comprises the clock signal produced by network 100, array sample size remains constant irrespective of variations in the velocity of carriage 20. In other words, where carriage 20 slows down, array shutter time becomes longer. If carriage 20 speeds up, array shutter time becomes shorter.

Initial actuation of line transfer counter 115 is controlled by the offset counter 120 associated therewith. Offset counter 120, which is driven by the clock signal in output lead 111, is preset to toll a count representing the time interval required for array 1 to reach start of scan line 101 following start up of carriage 20. On tolling the preset count, offset counter 120 generates a signal in lead 122 enabling line transfer counter 115.

It will be understood that the offset counters 115 associated with the circuits 114 for the remaining arrays 2, 3, 4 are similarly preset to a count representing the distance $d_2$, $d_3$, $d_4$, respectively by which arrays 2, 3, 4 are offset from start of scan line 101.

Referring particularly to FIG. 2 each array 1, 2, 3, 4 scans a portion of each line of the original document 12, the sum total of the data (less overlap as will appear more fully herein) produced by arrays 1, 2, 3, 4 representing the entire line. Preferably, arrays 1, 2, 3, 4 are of the same size with the same number of pixels 40. As described, the line transfer counters 115 of circuits 114 control the array imaging line shutter time for each scan, counters 115 being preset to activate the array associated therewith for a preselected period for this purpose. Scanned data from the arrays 1, 2, 3, 4 is clocked out by clock signals derived from a suitable pixel clock 118.

Sampled analog video data from the arrays 1, 2, 3, 4 is fed to a suitable video processor 148 which converts the video signals to a binary code representative of pixel image intensity. The binary pixel data from processor 148 is mapped into segments or words by Pixel Data Bit Mapper 149 for storage in offset relation in RAM 175 as will appear. Bit Mapper 149 is driven by clock signals from pixel clock 118. Data from Bit Mapper 149 is passed via data bus 174 to RAM 175 where the data is temporarily stored pending receipt of data from the array which last views the line. In the exemplary arrangement illustrated, the last array would be array 4.

Multiplexer 150 may be provided in data bus 174 to permit data from other sources (OTHER DATA) to be inputted to RAM 175.

The binary data is stored in sequential addresses in RAM 175 (see FIG. 4), the data being addressed into RAM 175 on a line by line basis by the RAM address pointers 165 through Address Bus 180. The clock signal output from pixel clock 118 is used to drive address pointers 165. Line scan counter 170, which is driven by the output from line transfer counter 115, controls the number of full scan lines that will be stored in RAM 175 before recycling. The output of counter 170 is fed to RAM Address pointer 165 via lead 119. It is understood that line scan counters 170 are individually preset to reflect the degree of array offset in the Y-direction.

Ram 175 provides a buffer for scanned data from each array, RAM 175 buffering the data until a full line is completed following which the data is read out. A suitable priority encoding system (not shown) may be used to multiplex the data input from arrays 1, 2, 3, 4 with the address associated therewith. Ram 175 has input and output ports for input and output of data thereto.

Figure 4:
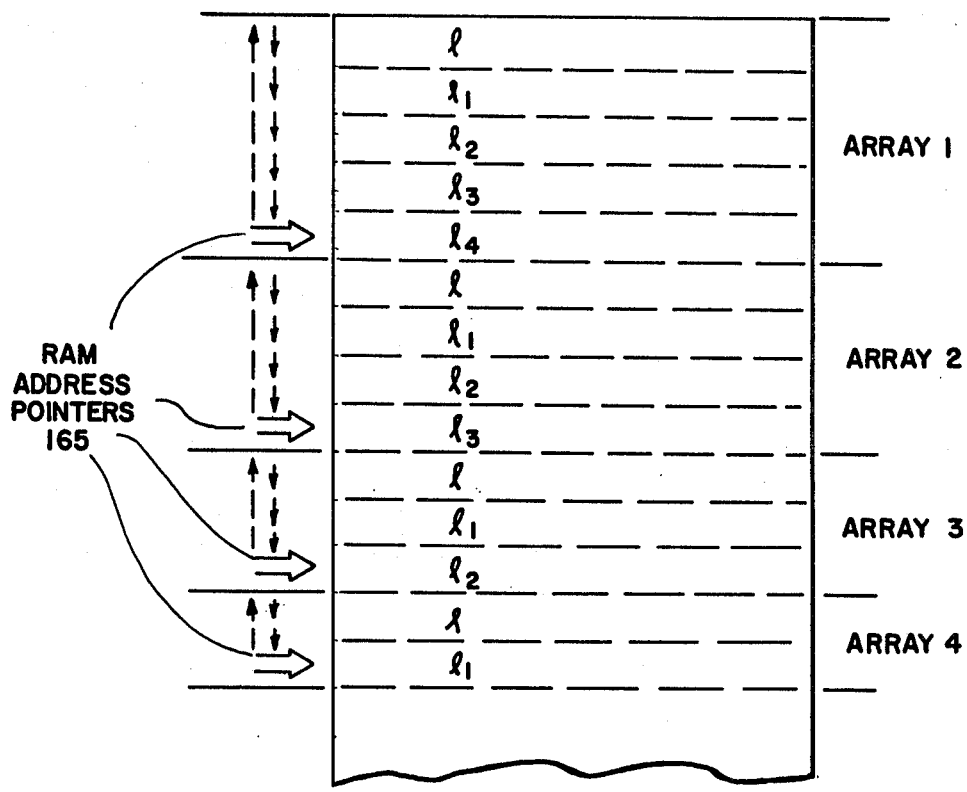
FIG. 4 is a schematic representation of the memory buffer for temporarily storing image data.

Since the degree of misalignment of arrays 1, 2, 3, 4 in the Y-direction may vary, the storage capacity of RAM 175 must be sufficient to accommodate the maximum misalignment anticipated. A worse case misalignment is illustrated in FIG. 4 wherein it is presumed that arrays 1, 2, 3, 4 are each misaligned by a full line. In that circumstance and presuming scanning of line 1 is completed, RAM 175 then stores the line data for lines l, $l_1$, $l_2$, $l_3$, $l_4$ from array 1, lines l, $l_1$, $l_2$, $l_3$ from array 2, lines l, $l_1$, $l_2$ from array 3, and lines l, $l_1$ from array 4. The blocks of binary data that comprise the completed line 1 are in condition to be read out of RAM 175. In the above example, an extra line of data storage is provided.

Line scan counters 170 are recycling counters which are individually preset for the number of lines of data to be stored for the array associated therewith. As a result, address pointers 165 operate in round robin fashion on a line by line basis. On reaching a preset count, the signal from counters 170 recycle the address pointer 165 associated therewith back to the first storage line to repeat the process. It is understood that prior thereto, that portion of RAM 175 has been cleared of data.

Figure 5:
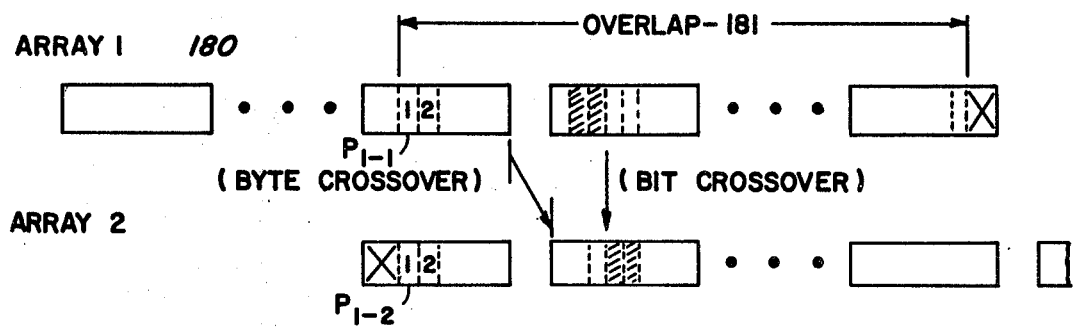
FIG. 5 is a schematic illustration of the data mapping arrangement to avoid bit shifting on readout from the temporary memory buffer of FIG. 4.

As described, data from video processing hardware 148 is stored temporarily in RAM 175 pending completion of the line. In placing the data in RAM 175, the data is preferably mapped in such a way as to avoid the need for subsequent data bit shifting when outputting the data. Referring to FIG. 5, wherein mapping of pixel data from arrays 1, 2 is illustrated, data from an earlier array (i.e. array 1) is mapped by Pixel Data Bit Mapper 149 (FIG. 3) into segments or words 180 before being stored in RAM 175. The first pixel ($P_1$-1) of the array within the array overlap 181 is mapped into a known bit position within the segment or word 180 at the point of overlap.

At the end of line transfer, the first pixel ($P_1$-2') of the succeeding array (i.e. array 2) is clocked into the bit position ($P_1$-1) of the first overlapped pixel of the previous array. This correlates the first overlapping pixel ($P_1$-2) of the succedding array (i.e. array 2) with the first overlapped pixel ($P_1$-1) of the preceding array (i.e. array 1). Crossover from one array to the succeeding array on data readout may then be effected without the need to shift bits.

Figure 6:
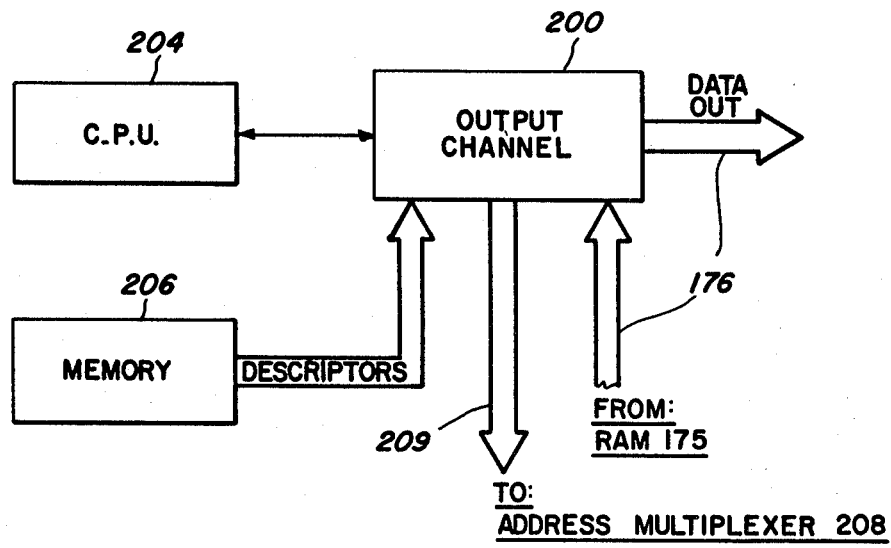
FIG. 6 is a schematic view showing the data readout system.
Figure 7:
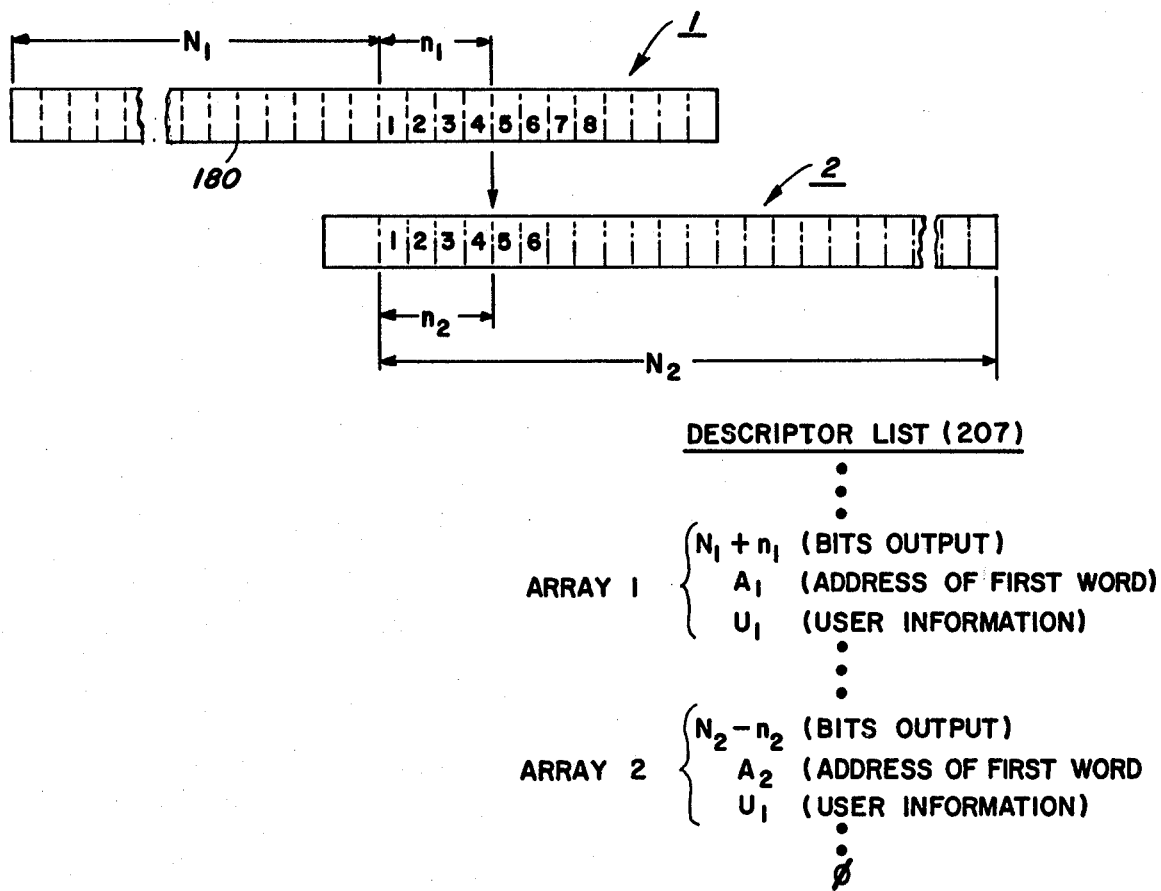
FIG. 7 is a schematic illustration of the data readout with crossover and removal of redundant data.

Referring now to FIGS. 6 and 7, video data held in RAM 175 is read out to a user (not shown) via RAM output bus 176, in both tangentially and spatially corrected form, line by line, through output channel 200. Data readout is controlled by a microprocessor, herein CPU 204 in accordance with address program instructions in memory 206. CPU 204 may comprise any suitable commercially available processor such as a Model M6800 manufactured by Motorola, Inc.

The address program instructions in memory 206 include a descriptor list 207. List 207 contains information identifying the number of bits to be read out ($N_n$), the address of the first word (A), and other user information (U). The DATA OUT address information is fed to address multiplexer 208 via address bus 209.

As described heretofore, exact tangential alignment and end to end abutment of multiple arrays is difficult to achieve. In the arrangement shown, sagittal misalignment (in the Y direction) among the arrays is accommodated by offset counters 120 of the individual array operating circuits 114. The need to accurately abut the arrays end to end is obviated by overlapping succeeding arrays.

As a result of the above, the sequence in which video data is inputted to RAM 175 offsets sagittal misalignments between the several arrays. By outputting the data from RAM 175 on a line by line basis, the lines are reconstructed without sagittal misalignment.

Due to the overlapping disposition of arrays 1, 2, 3, 4, data within the overlapping portions of the arrays is redundant. To obviate this and provide a complete line of data without repeated or redundant portions, bit crossover on readout within the overlapping regions is used.

Referring now to the embodiment shown in FIG. 7, data bit crossover within the overlapping portions of arrays 1, 2, 3, 4 is effected by an algorithm which picks a predetermined last cell to be sampled within the overlapped region and automatically picks the next bit in the succeeding array. In the descriptor list 207 illustrated in FIG. 7, the total bit output from the first array is $N_1$ bytes+$n_1$ bits with the bit output from the second array $N_2$ bytes−$n_2$ bits. In the example shown in FIG. 7, crossover from array 2 to array 1 is effected between bit 4 and bit 5.

Figure 8:
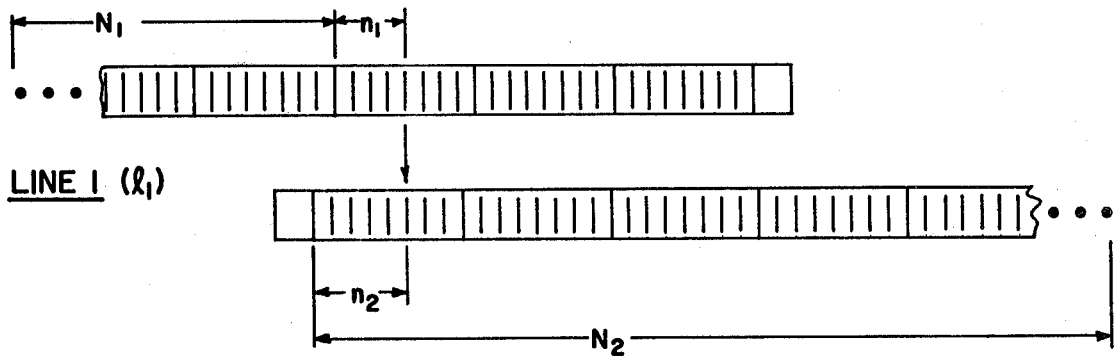
FIG. 8 is a schematic illustration of an alternate randomized crossover technique.
Figure 8:
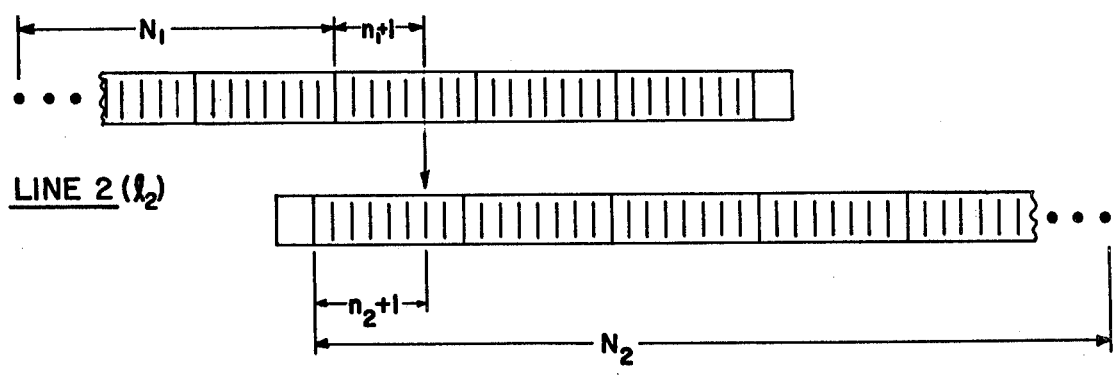
Figure 8:
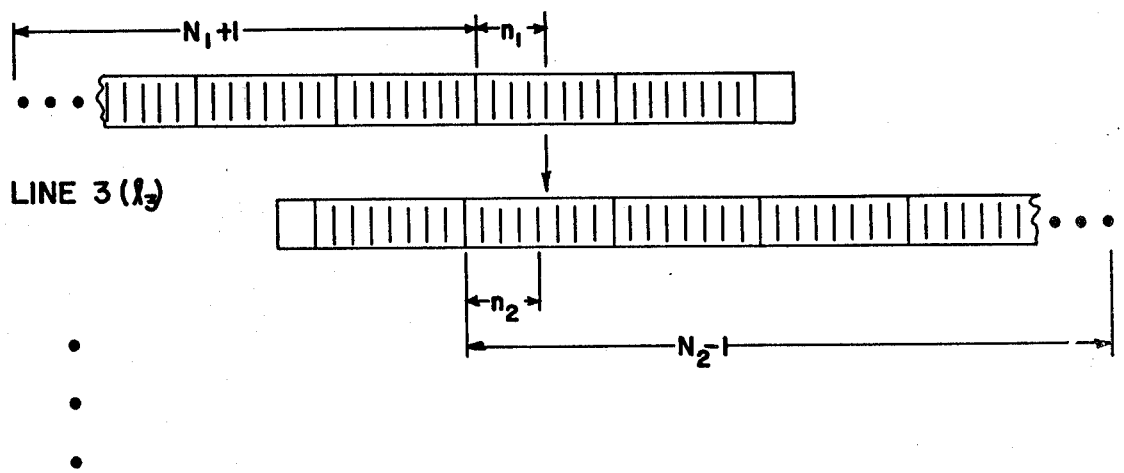
Figure 9:
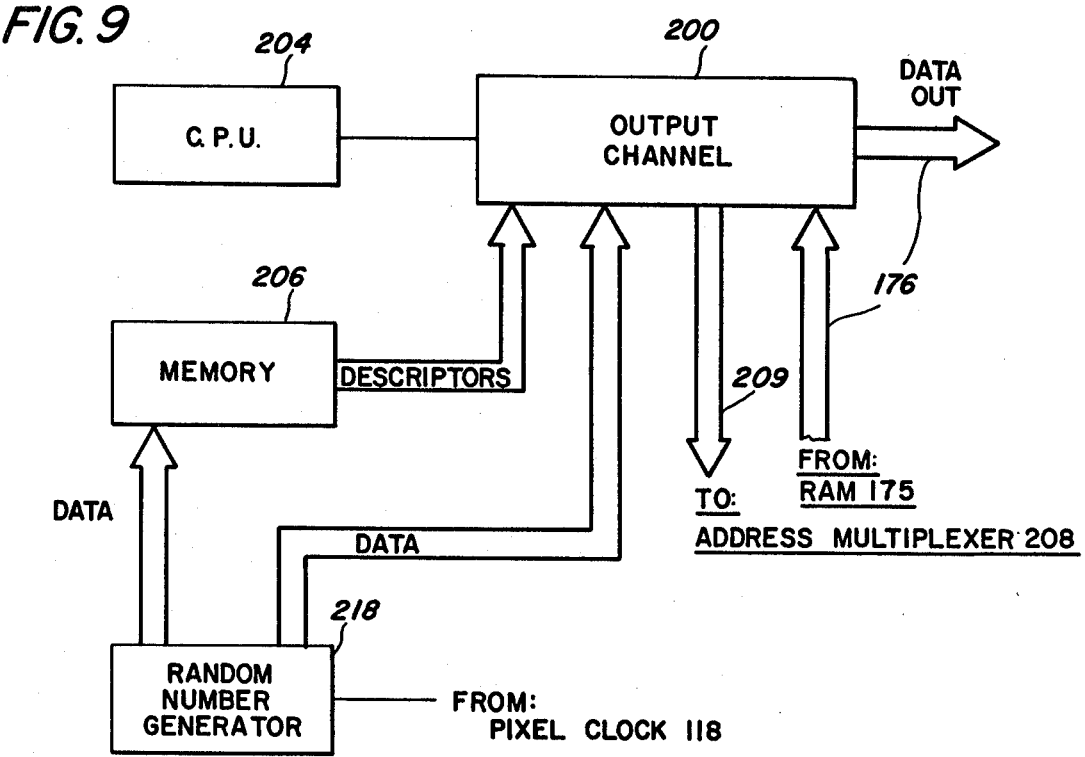
FIG. 9 is a schematic representation of the data readout system for effecting randomized crossover.

In the embodiment shown in FIGS. 8 and 9, bit crossover from one array to the other during readout of data from RAM 175 is effected, within the array overlapping region, on a randomized basis. As described, the image data is mapped into sequences or words 180 by Bit Mapper 149. Randomized crossover is effected by varying either or both of the byte (N) and bit (n) selections within the crossover area.

In the embodiment shown, a suitable random number generator 218, which is driven by the clock output of pixel clock 118, generates randomized count sequences within the crossover limits from each array pair. Memory 206 uses the count output of generator 218 to vary the byte/bit address of descriptor list 207 (FIG. 7). As a result, the point at which crossover from one array to the next succeeding array takes place varies with each line.

In the example shown in FIG. 8, array crossover is effected on readout of the first line ($l_1$) between bits $N_1+n_1$ and $N_2·_{-n2}$; for the second line ($l_2$) between bits $N_1+(n_1+1)$ and $N_2-(n_2+1)$, and between bits $(N_1+1)+n_1$ and $(N_2-1)-n_2$ of the third line.

While the invention herein has been described in exemplary fashion in a raster type input or scanning apparatus environment, it will be understood that the principles of the present invention may be utilized with raster type output, i.e. imaging, devices. In that type of application, multiple imaging elements, herein, imaging arrays 500, are arranged in succession upon a support structure or base as in the case of the photosensitive linear arrays 1, 2, 3, 4 described heretofore. The imaging arrays 500 are disposed with the adjoining ends thereof overlapping to enable the entire length of the line to be covered by arrays whose individual linear extent is less than the line length.

Figure 10:
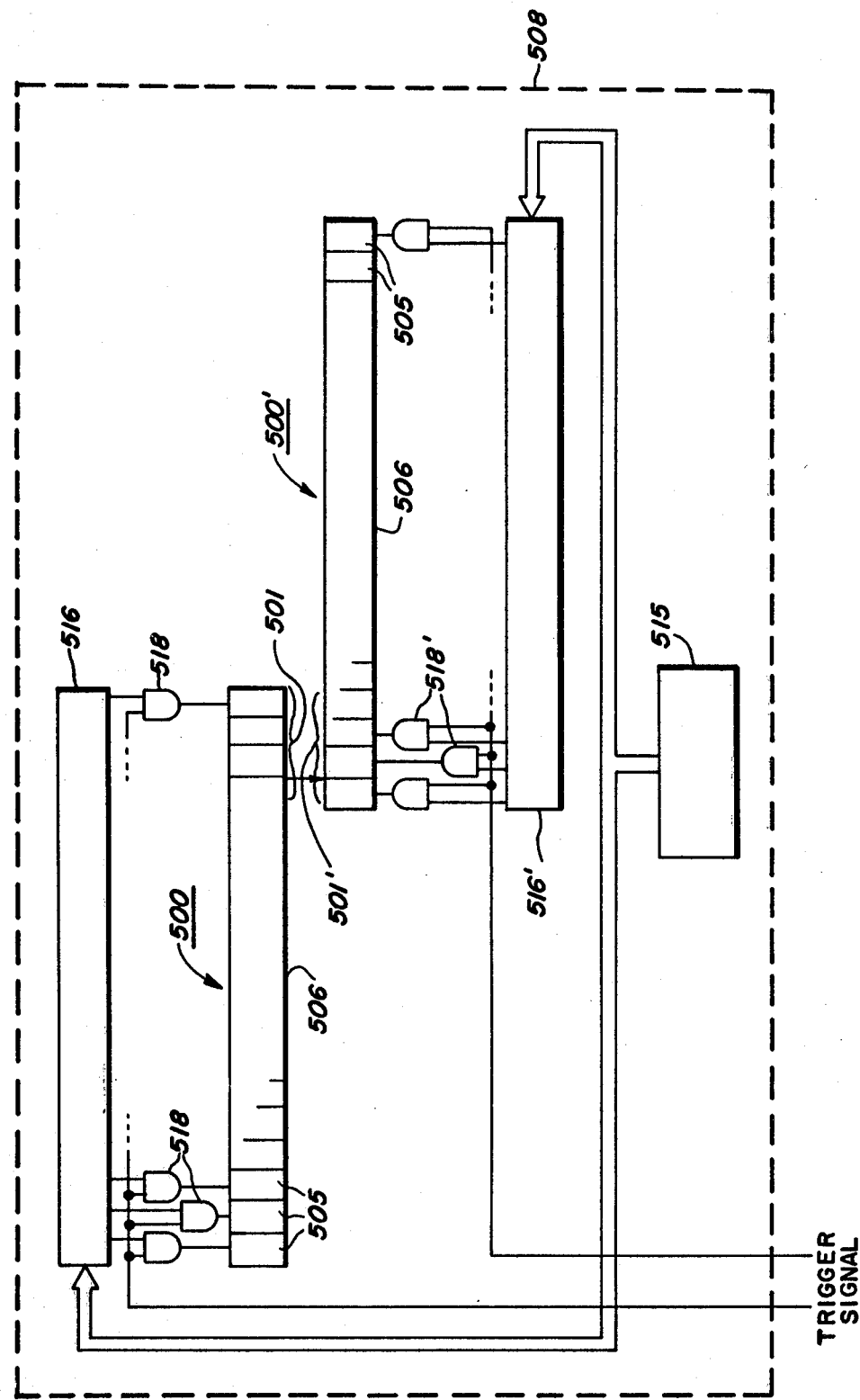
FIG. 10 is a schematic view of an imaging or output array configuration employing paired overlapping arrays.

Referring to FIG. 10, an exemplary arrangement is shown employing plural imaging arrays 500, 500' disposed so that the adjoining ends 501, 501' overlap. Imaging arrays 500, 500' are each comprised of a plurality of light emitting diodes (L.E.D.s herein) 505 mounted in succession upon a suitable base 506. Arrays 500, 500' are arranged in operative exposure relationship with the relatively movable photoconductive member 508 of a xerographic apparatus (not shown).

As understood by those skilled in the xerographic arts, exposure of the photoconductive member 508, which has been previously uniformly charged by a suitable corona type charging device, discharges the charged portions of member 508 in a pattern corresponding to the illumination pattern of L.E.Ds 505. The latent electrostatic image created thereby on photoconductive member 508 is thereafter developed with suitable electroscopic marking material, i.e. toner. The developed image may be then transferred to a suitable copy substrate material, i.e. paper, and fused to provide a permanent copy of the image.

Imaging arrays 500, 500' may be loaded with binary image data from a suitable source such as random access memory (RAM) 515 through serial-to-parallel buffers 516, 516'. The output gates of buffers 516, 516' are coupled to the individual L.E.D.s 505 comprising exposure arrays 500, 500' through control gates 518, 518'. A suitable trigger source (not shown) enables gates 518, 518' following loading of the last bit of image data in the buffer 516, 516' associated therewith.

In operation, the output gates of buffers 516, 516' are loaded with a binary signal pattern representative of the image data stream inputed thereto. On enabling of gates 518, 518', individual L.E.D.s are actuated in accordance with the binary signal pattern to discharge photoconductive member 508 in correspondence with the image data.

To prevent repetitive exposure of photoconductive member 508 in areas where exposure arrays 500, 500' overlap, crossover is made electronically from array 500 to array 500' within the overlapping areas 501, 501'. Crossover may be effected by a controlling algorithm which picks on either a fixed or random basis a predetermined image bit within the overlapping area as the last image bit for imaging array 500 and the next image bit of the data stream as the first image bit for imaging array 500'. In this circumstance, the image data flows from memory 515 to output buffers 505,505' and arrays 500, 500' rather than from the arrays (i.e. arrays 1, 2, 3 and 4) to output bus 176 as described heretofore. Buffers 516, 516' are loaded with data bits corresponding to the L.E.D.s 505 to be used in each array 500, 500'.

For example, if it be assumed that each image line comprises 2000 image bits and that each imaging array 500, 500' has 1100 L.E.D.s, the array overlap totals 200 L.E.D.s and falls in the range of 1000 and 1200 image bits. If the crossover point is selected between image bits 1099 and 1100, buffer 516 would be loaded with image bits 0-1099 and buffer 516' loaded with image bits 1100-2000. The L.E.D.s of array 500 corresponding to image bits 1100-1200 would not be used. Similarly, the L.E.D.s of array 500' corresponding to image bits 1000-1099 would be unused in this crossover example. If the crossover point is fixed, crossover from array 500 to array 500' would repeatedly occur between image bits 1099 and 1100 in the example provided. If the crossover point is selected on random basis, crossover from array 500 to array 500' might take place for example between bits 1090 and 1091 for the next line, between bits 1120 and 1121 for the line after that, and so forth and so on.

While an overlapping exposure array pair 500, 500' has been illustrated and described herein, it will be understood that the principles of the invention are applicable to exposure array configurations employing more than two arrays.

Further, imaging array constructions employing multiple imaging devices other than L.E.D.s 505 and which may produce for example, copy paper, may be contemplated as, for example, exposure arrays comprised of multiple injection lasers or laser diodes, or printing arrays comprised of multiple ink jets, or electrostatic writing arrays comprised of multiple electrostatographic styli, or thermo magnetic (i.e. Curie point) arrays comprised of multiple thermal heads, or ferro magnetic imaging arrays comprised of multiple magnetic recording heads.

While the invention has been described with reference to the structure disclosed, it is not confined to the details set forth, but is intended to cover such modifications or changes as may come within the scope of the following claims:

What is claimed is:

1. In a raster imaging apparatus for producing images on a member in response to image signals, the improvement comprising:

at least two imaging arrays, each of said arrays comprising a plurality of discrete imaging elements arranged in succession along the imaging axis of said array, the length of the area imaged by each of said arrays being less than the width of said member along said imaging axis;

means supporting said arrays for movement relative to said member with the imaging axis of said arrays extending in a direction substantially perpendicular to the direction of said movement;

said arrays being supported so that the areas imaged by each of said arrays overlap whereby to provide a composite imaged area;

and image signal input means for inputting image signals to said array imaging elements to actuate said imaging elements selectively in accordance with said image signals to produce images on said member, said image signal input means including crossover means for crossing over from one array to the next succeeding array within the overlapping portion of the areas imaged by each of said arrays on a random basis.

2. The raster imaging apparatus according to claim 1 in which said crossover means changes the crossover point between said arrays following a predetermined block of image signals.

* * * * *